United States Patent [19]

Talmy et al.

[11] Patent Number: 4,948,766

[45] Date of Patent: Aug. 14, 1990

[54] RIGID MULLITEWHISKER FELT AND METHOD OF PREPARATION

[75] Inventors: Inna G. Talmy, Silver Spring, Md.; Deborah A. Haught, Reston, Va.

[73] Assignee: The United States of America as represented by the Secretary of the Navy, Washington, D.C.

[21] Appl. No.: 229,517

[22] Filed: Aug. 5, 1988

[51] Int. Cl.$^5$ .............................................. C04B 35/18
[52] U.S. Cl. ...................................... 501/128; 501/95; 501/127; 501/86; 501/153
[58] Field of Search ................... 501/128, 95, 97, 133, 501/127

[56] References Cited

U.S. PATENT DOCUMENTS 4,585,500  4/1989  Minjolle et al. ...................... 501/95

OTHER PUBLICATIONS

Nemets et al., Development of a Ceramic Material Self-Reinforced with Needle-Shaped Mullite Crystals, Tr.-Mosk. Khim-Tekhnol. Inst. im. D. I. Mendeleeva, 1882, 123, 30–3 (Russian).

*Primary Examiner*—William R. Dixon, Jr.
*Assistant Examiner*—Sue Hollenbeck
*Attorney, Agent, or Firm*—Kenneth E. Walden; Roger D. Johnson

[57] ABSTRACT

A process in which (1) $AlF_3$ and $SiO_2$ or $AlF_3$, $SiO_2$, and $Al_2O_3$ powders are formed into a green body of a desired shape and size; (2) the green body is heated at 700° C. to 950° C. in an anhydrous $SiF_4$ atmosphere to form barlike topaz crystals; and then (3) heated in an anhydrous $SiF_4$ atmosphere at about 1150° C. to 1700° C. to convert the barlike topaz crystals to needlelike single crystal mullite whiskers which form a porous, rigid felt structure. The felt has the same shape as the green body with about 1.5 or less percent change in linear dimensions. The felt can be used as preforms for ceramic-matrix or metal-matrix composites or by itself as thermal insulation.

29 Claims, 6 Drawing Sheets

RIGID MULLITEWHISKER FELT AND METHOD OF PREPARATION

BACKGROUND OF THE INVENTION

This invention relates to ceramics and more particularly to mullite.

Conventional techniques for preparation of fibrous ceramic thermal insulators and fibrous ceramic preforms for ceramic/metal matrix composites are pressing and vacuum forming g with the additions of organic or inorganic binders. Both techniques require deagglomerating the fibers and mixing with the binders before forming and then drying, machining, removing binder and prefiring (if necessary) after forming. For example, U.S. Pat. No. 3,104,943 entitled "Spinnable Mullite Fibers and their Preparation" which was issued to Kenneth L. Berry on Apr. 25, 1960, discloses a method whereby mullite fibers are crystallized from a vapor phase derived from heating sources of Si, Al, $O_2$, and S in a atmosphere containing at least one percent $H_2$ at 800°–1200° C. A suspension of the such prepared fibers is than filtrated to form a felt. This step requires extra handling which increases the cost and may damage the fibers. Additionally, the complexity of the felt or mat shapes is limited by the filtration technique. Moreover, the resulting felt is composed of polycrystalline fibers rather than single crystal whiskers. As a reinforcing material, whiskers are preferable to fibers because they are single crystals and their properties are not affected by grain growth and grain boundary-induced creep at high temperatures. The low free energy and high modulus and strength of whiskers compared to polycrystalline materials make it possible to use whiskers to reinforce matrices of the same composition.

Therefore, it would be desirable to provide a simple, economical and in-situ process capable of producing high-quality single crystal mullite-whisker felt even in complex shapes with good dimensional control.

SUMMARY OF THE INVENTION

Accordingly, an object of this invention is to provide a method of producing high quality rigid mullite-whisker felt for preforms and thermal insulators.

Another object of this invention is to provide a simple, economical and in-situ method of producing high-quality mullite-whisker felt for preforms and thermal insulators.

A further object of this invention is to provide a method of producing complex-shaped mullite-whisker felt for preforms and thermal insulators.

Yet another object of this invention is to provide a method of producing articles of mullite-whiskers felt within well-specified dimensional tolerances.

These and other objects of this invention are accomplished by providing a process of the following steps in order:

(1) forming a green body of a desired shape and size from an intimate, uniform mixture of $AlF_3$ and $SiO_2$ or $AlF_3$, $SiO_2$, and $Al_2O_3$ powders in amounts selected to produce stoichiometric mullite or a solid solution of $Al_2O_3$ in stoichiometric mullite;

(2) heating the green body in an anhydrous $SiF_4$ atmosphere at a temperature of from about 700° C. to about 950° C. until $AlF_3$ reacts with $SiO_2$ to form barlike topaz crystals; and (3) heating the barlike topaz crystals in an anhydrous $SiF_4$ atmosphere at a temperature of from about 1150° C. to about 1700° C. until the barlike topaz crystals are converted to needlelike single crystal mullite whiskers which form a porous, rigid felt structure.

The felt structure comprises single crystal mullite whiskers which are uniformly distributed and randomly oriented in three dimensions and which are mechanically interlocked to form a rigid felt structure capable of maintaining its shape without binders. The single crystal mullite whiskers are composed of stoichiometric mullite or solid solutions of $Al_2O_3$ in stoichiometric mullite.

The felt can be used as preforms for ceramic-matrix and metal-matrix composites or by itself as thermal insulation.

BRIEF DESCRIPTIONS OF THE FIGURES

A more complete appreciation of the invention and many of its attendant advantages thereof will be readily appreciated as the same becomes better understood by reference to the following detailed description when considered in connection with the accompanying scanning electron microscope (SEM) pictures wherein.

DETAILED DESCRIPTION OF THE PREFERRED EMBODIMENT

The present invention includes high-purity mullite-whisker rigid felts and practical methods of preparing them in-situ. In the present processes the starting materials ($SiO_2$, $AlF_3$, and optionally $Al_2O_3$) are intimately mixed as powders and formed into green bodies of the desired shape and size by conventional ceramic techniques such as pressing, cold isostatic pressing, extrusion, injection molding, and slip casting, etc. The shape of the final mullite-whisker rigid felt will be the same as the green body with about 1.5 or less percent change in linear dimensions. The present process does not limit the size or shape of green bodies which may be used.

Handling of material can be kept at a minimum in the process. The green body is preferably placed into a reactor (covered crucible, sealed furnace, etc.) where an anhydrous $SiF_4$ atmosphere (~100 percent $SiF_4$) can be maintained during the process. The material is not handled again until the finished high-purity mullite-whisker rigid felt product, is removed from the reactor.

The high-purity mullite-whisker rigid felts may be used as thermal insulation. The felts may also be used as preforms for mullite whisker-reinforced ceramic-matrix and metal-matrix composites.

Critical to the operation of the present process are the reaction between $AlF_3$ and fused $SiO_2$ in an anhydrous $SiF_4$ atmosphere at a temperature from about 700° C. to about 950° C. to form barlike topaz crystals according to the reaction (1):

$$2AlF_3 + 2SiO_2 \rightarrow Al_2(SiO_4)F_2 + SiF_4 \quad (1)$$

and the decomposition of the barlike topaz crystals in an anhydrous $SiF_4$ atmosphere at temperatures of from about 1150° C. to 1700° C. to form single crystal mullite whiskers according to the reaction (2):

$$6Al_2(SiO_4)F_2 + SiO_2 \rightarrow 2(3Al_2O_3 \cdot 2SiO_2) + 3SiF_4 \quad (2)$$

The overall reaction between $AlF_3$ and fused $SiO_2$ to form mullite whiskers is (3):

$$12AlF_3 + 13SiO_2 \rightarrow 2(3Al_2O_3 \cdot 2SiO_2) + 9SiF_4 \quad (3)$$

Thus 6 moles of $AlF_3$ react with 6.5 moles of fused $SiO_2$ to form each mole of mullite. If an exact stoichiometric 6:6.5 ratio of $AlF_3$ to $SiO_2$ is used, excess $SiO_2$ may be present in the final mullite-whisker felt because of loss of $AlF_3$ during the process. This can be corrected by increasing the amount of $AlF_3$ used to compensate for $AlF_3$ lost during the process.

The anhydrous $SiF_4$ atmosphere is critical to this process. The $SiF_4$ atmosphere consists essentially of $SiF_4$ (i.e., about 100 percent $SiF_4$). Attempts failed to produce the needlelike single crystal mullite whiskers from $AlF_3$ and $SiO_2$ when the process was run in an open crucible in an oxidizing atmosphere (air) or even in a dry, flowing inert gas (argon). Therefore, the use of $SiF_4$, which is generated in large quantities by the process reactions, is a sensible approach.

Figure 3A:
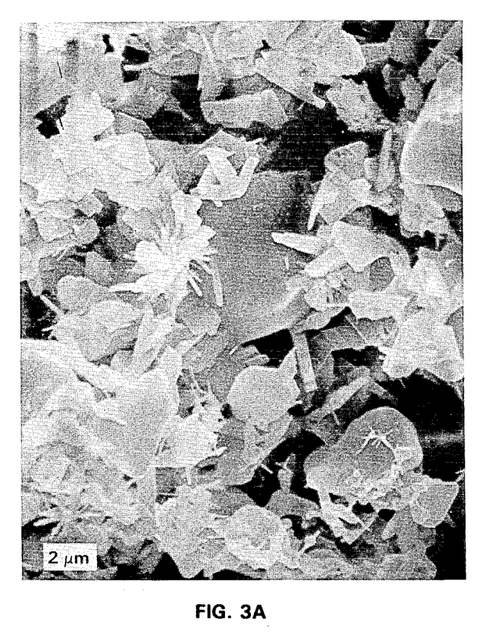
FIGS. 3A and 3B show that when (A) 80 and (B) 85 percent of the $AlF_3$ is replaced with $Al_2O_3$, the products consist of some mullite whiskers with high amounts of unreacted $Al_2O_3$ and $SiO_2$ as cristobalite.
Figure 3B:
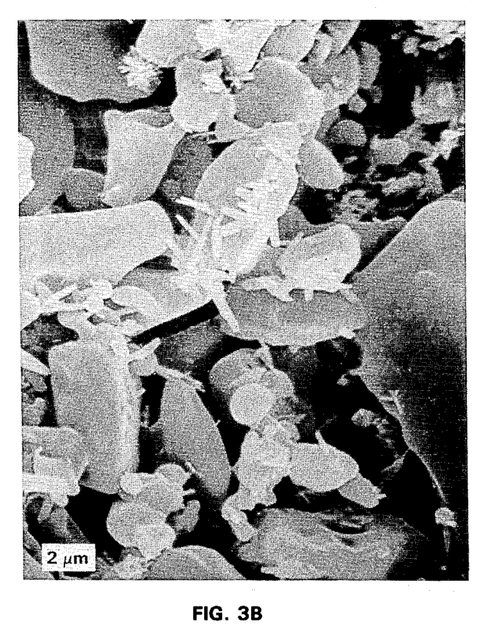
Figure 4A:
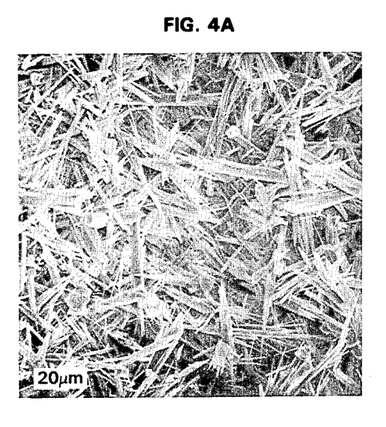
FIGS. 4A through 4D show that $Al_2O_3$ particle size in the starting materials of (A) 0.05 microns or less and (B) 0.3 microns or less produce the desired mullite-whisker felt product while average $Al_2O_3$ particle sizes of (C and D) 4 microns or greater fail to produce the desired mullite-whisker felt product.
Figure 4B:
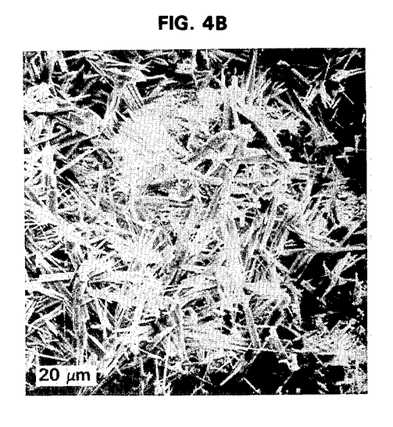
Figure 4C:
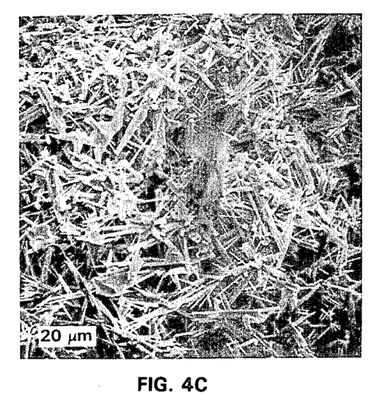
Figure 4D:
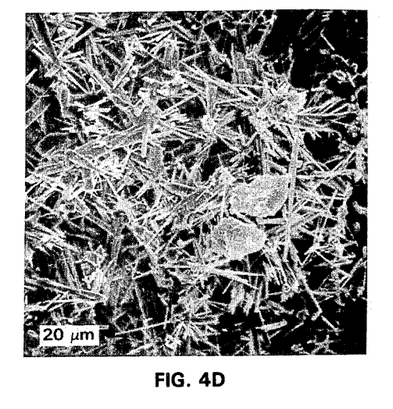

The composition of the starting material can be modified by introducing up to 75 percent of the aluminum as $Al_2O_3$ instead of as $AlF_3$ with mullite-whisker felt as a final product. This is done by using 0.5 mole of $Al_2O_3$ for each mole of $AlF_3$ replaced Note that at least 25 percent of the aluminum must be supplied by $AlF_3$ for the process to work. The substitution of more than 75% $Al_2O_3$ for $AlF_3$ leads to the formation of products consisting of some mullite whiskers with high amounts of unreacted $Al_2O_3$ and $SiO_2$ as cristobalite, as FIG. 3A (80% $Al_2O_3$) and FIG. 3B (85% $Al_2O_3$) show.

The advantages of using $Al_2O_3$ are that less of the relatively expensive $AlF_3$ and less of the $SiO_2$ are required, and less of the hazardous $SiF_4$ is generated by the reactions in the production of mullite-whisker felt. Moreover, as is shown in Table 3 of Example 2, the bending strength of the mullite-whisker felt increases as the amount of $Al_2O_3$ substituted for $AlF_3$ increases up to the 75 percent limit.

When a mixture of $AlF_3$, $SiO_2$, and $Al_2O_3$ is used, barlike topaz crystals are first produced at the lower temperature (about 700° C. to about 950° C.). The topaz is formed from $AlF_3$ and $SiO_2$ according to reaction (1):

$$2AlF_3 + 2SiO_2 \rightarrow Al_2(SiO_4)F_2 + SiF_4. \quad (1)$$
topaz

It appears that the $SiF_4$ generated reacts with $Al_2O_3$ to produce $AlF_3$ and $SiO_2$ according to reaction (4):

$$3SiF_4 + 2Al_2O_3 \rightarrow 4AlF_3 + 3SiO_2. \quad (4)$$

Reactions (1) and (4) proceed simultaneously until the $AlF_3$, $Al_2O_3$, and $SiO_2$ are converted to topaz.

When more than 50% $Al_2O_3$ is substituted for $AlF_3$, some unreacted $Al_2O_3$ and $SiO_2$ may be present with the barlike topaz crystals after heating at 700–950° C. However, at higher temperatures the unreacted $SiO_2$ and $Al_2O_3$ and the $SiF_4$ generated by reaction(s) interact to form mullite whiskers as a final product.

As FIGS. 2A through 2D illustrate, as the mole percentage of $AlF_3$ replaced with $Al_2O_3$ is increased, the stoichiometric single crystal mullite whiskers produced in the felt become smaller. Again, no more than 75 percent of the $AlF_3$ can be replaced with $Al_2O_3$.

Table 1 presents the stoichiometric amounts of starting materials required to produce one mole of mullite as a function of the mole percent of $AlF_3$ replaced with $Al_2O_3$.

TABLE 1

| % $AlF_3$ replaced | moles per mole of mullite | | |
|---|---|---|---|
| | $AlF_3$ | $SiO_2$ | $Al_2O_3$ |
| 0 | 6.000 | 6.500 | 0 |
| 25 | 4.500 | 5.375 | 0.750 |
| 50 | 3.000 | 4.250 | 1.500 |
| 75 | 1.500 | 3.125 | 2.250 |

If exact stoichiometric amounts of $AlF_3$, $SiO_2$, and $Al_2O_3$ are used, $AlF_3$ loss during the process could result in an excess of $SiO_2$ in mullite whiskers. To prevent this, excess of $AlF_3$ is used in the starting mixture to compensate for the $AlF_3$ which is lost. However, adding too much $AlF_3$ can result in an excess of $Al_2O_3$ in the mullite whiskers. In general, the amounts used may be adjusted to accommodate variations in $AlF_3$ loss. The object is to achieve the desired weight percentages of $Al_2O_3$ and $SiO_2$ in the mullite final product.

Figure 5A:
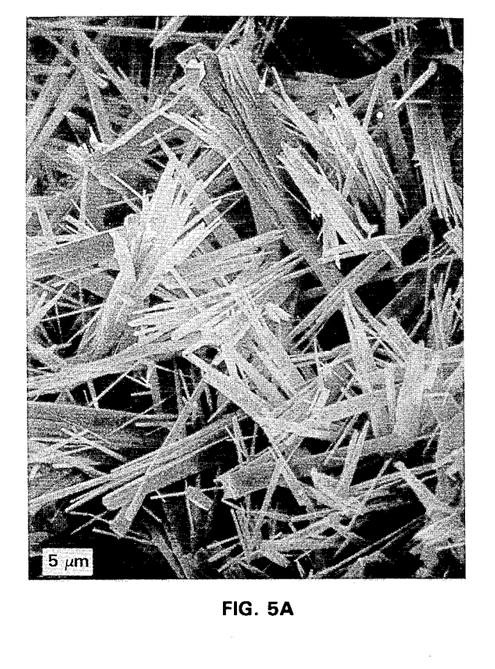
FIGS. 5A and 5B show that (A) the desired mullite-whisker felt is produced in an anhydrous $SiF_4$ atmosphere whereas (B) a nonuniform-structured felt consisting of much smaller mullite whiskers and mullite agglomerates is produced in an oxidizing (air) atmosphere.
Figure 5B:
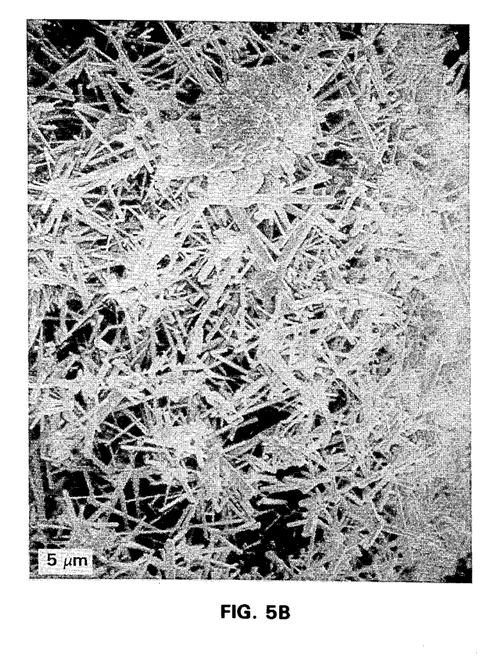

The starting materials for the process are anhydrous $AlF_3$, fused $SiO_2$ and optionally $Al_2O_3$ which are intimately mixed as loose powders. Commercially available $AlF_3$ (99.90%), fused $SiO_2$ (99.50%) and $Al_2O_3$ (99.99%) are preferably used. The particle size of the $Al_2O_3$ is important and is preferably less than 1 micron, more preferably 0.3 microns or less, and still more preferably 0.05 microns or less. For example, as shown in FIG. 5A and FIG. 5B the desired mullite-whiskers felt was produced from $Al_2O_3$ particle sizes of (A) 0.05 micron or less and (B) 0.3 microns or less. On the other hand, FIGS. 5C and 5D show that $Al_2O_3$ with a particle size of 45 microns or greater failed to produce the desired mullite-whisker felt. The particle sizes of the $AlF_3$ and $SiO_2$ are less important. The intimate, uniform mixtures of $AlF_3$ and $SiO_2$ or $AlF_3$, $SiO_2$, and $Al_2O_3$ may be formed by mixing the powders in a suitable inert, volatile solvent such as ethanol and then drying the resulting mixture. In the examples, the mixture was then ground with a corundum mortar and pestle and screened through a 40 micron sieve to break up any agglomerates.

The composition of commercially available $AlF_3$ seems to vary considerably. Therefore, it is recommended that a sample of the $AlF_3$ be weighed, heated for a few hours to 600° C. and then reweighed or subjected to thermal gravametric analysis. The loss of weight should preferably be less than 3% and more preferably less than 1.5%. The amount of $AlF_3$ used should be increased to compensate for any loss measured.

The green shapes for this process can be formed from mixtures of $AlF_3$, and $SiO_2$ and optionally $Al_2O_3$ powders conventional methods such as cold pressing, cold isostatic pressing, extrusion, injection molding, and slip casting, etc. The resulting green bodies have porosity of about 40 to about 60 percent. Any conventional binders such as paraffin waxes can be used in this process. The amount of binder depends on the shaping technique selected. For example, about 5 volume percent of wax works well for cold pressing; whereas up to 50 volume percent is used for injection molding. Again, the amounts and types of binders are those conventionally used for processing ceramic powders.

After the green body has been formed into the desired shape, the binder is removed prior to the firing process. For instance, in the examples the paraffin wax binder is burnt-out by heating very slowly (0.5°–1.0° C./min) to 300° C. in oxidizing atmosphere.

In the first firing step of the present process, the green bodies are heated in an anhydrous $SiF_4$ atmosphere at from about 700° C. to about 950° C. to form barlike topaz crystals. With $AlF_3$ and $SiO_2$ or with $AlF_3$, $SiO_2$, and $Al_2O_3$, the topaz is formed according to reaction (1). Generally, from 3 to 10 hours is sufficient for the complete formation of barlike topaz crystals. The reaction is carried out in an anhydrous $SiF_4$ atmosphere generated by the reaction or supplied from an external source. In the examples, covered corundum crucibles were used to confine the $SiF_4$ generated by the reaction. Although, the atmosphere of the crucible is initially air, the reaction generates enough $SiF_4$ to displace all of the air prior to the critical stage of forming barlike topaz. U.S. Pat. No. 4,911,902, entitled Mullite Whisker Preparation," which issued to Inna G. Talmy and Deborah A. Haught on Mar. 27, 1990, U.S. patent application Ser. No. 07/070,757; filed July 6, 1987, by Talmy et al. provides examples and data demonstrating the criticality of the anhydrous $SiF_4$ atmosphere to the formation of barlike topaz crystals. The anhydrous $SiF_4$ atmosphere is likewise critical to the formation of the barlike topaz crystals from $AlF_3$, $SiO_2$, and $Al_2O_3$.

Next, the barlike topaz crystals are decomposed to form needlelike, single crystal mullite whiskers by heating in anhydrous $SiF_4$ atmosphere at from about 1150° C. to about 1700° C. preferably from 1250° C. to 1350° C. and most preferably at about 1250° C. About 3 to 10 hours is sufficient for the complete conversion of barlike topaz crystals into single crystal mullite whiskers.

Figure 6A:
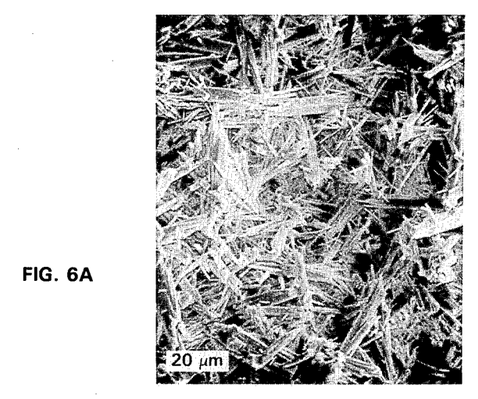
FIGS. 6A, 6B, and 6C show that (A) the desired mullite-whisker felt is produced under anhydrous conditions (fused silica) whereas (B and C) a felt consisting of smaller-sized mullite whiskers with $Al_2O_3$ inclusions is produced in the presence of water (silica gel) in a $SiF_4$ atmosphere.
Figure 6B:
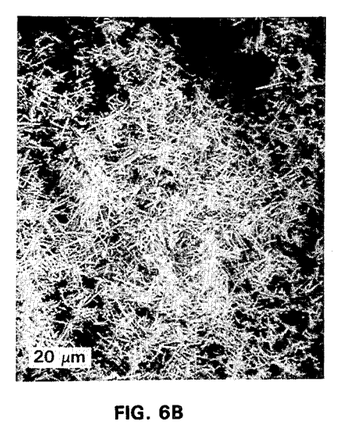
Figure 6C:
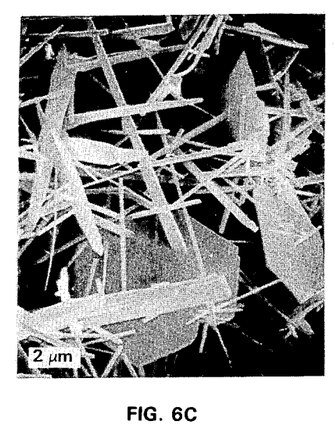

Again the criticality of using an anhydrous $SiF_4$ atmosphere in both the barlike topaz crystal forming step and the mullite whisker forming step is shown by FIGS. 5A, 5B, 6A, 6B, and 6C. FIGS. 5A and 6A show the desired mullite-whisker felt product which is produce when an anhydrous $SiF_4$ atmosphere is used in both reaction steps FIG. 5B shows a nonuniform-structured felt consisting of much smaller mullite whiskers and mullite agglomerates which are produced when a dry, oxidizing atmosphere (air) is used. FIGS. 6B and 6C show a felt consisting of smaller-size mullite whiskers with $Al_2O_3$ inclusions produced in the presence of water (silica gel) even in a $SiF_4$ atmosphere.

The described process can be carried out by first firing the green shape to form the barlike topaz crystals and then subsequently firing to produce the mullite whiskers. Or those two separate firings can be combined into a single firing with a hold at a temperature of from about 700° C. to about 950° C. to form barlike topaz crystals followed by a ramp to a temperature of from about 1150° C. to about 1700° C. to produce mullite whiskers. The one-fire process is preferable because it is more suitable for production on an industrial scale. Moreover, the process can be successfully carried out by continuously heating from room temperature up to a temperature of from 1150° C. to 1700° C. without a hold at from 700° C. to 950° C. at a slow heating rate of from 0.5 to 2.0° C./min.

Stoichiometric mullite ($3Al_2O_3.2SiO_2$) contains 71.80 weight percent of $Al_2O_3$ and 28.20 weight percent of $SiO_2$. However, acceptable compositions contain $Al_2O_3$ in the range of from 70.50 weight percent up to the point that the $Al_2O_3$ in stoichiometric mullite solid solution becomes saturated with $Al_2O_3$ (about 74 weight percent of $Al_2O_3$ according to the $Al_2O_3$—$SiO_2$ phase diagram of Aksay and Pask, *Science*, 1974, 183,69), with $SiO_2$ being the remainder. A preferred compositional range is from 71.80 weight percent $Al_2O_3$ up to the saturation point of the $Al_2O_3$ in stoichiometric mullite solid solution (about 74 weight percent $Al_2O_3$), with $SiO_2$ being the remainder of the mullite whisker composition. This preferred range contains stoichiometric mullite and the solid solution range of $Al_2O_3$ in stoichiometric mullite. The single crystal mullite whiskers of the composition in the solid solution range of $Al_2O_3$ in stoichiometric mullite will have essentially similar chemical and physical properties as stoichiometric mullite whiskers. A more preferred range of $Al_2O_3$ is from 71.80 to 73.00 weight percent, with 71.80 to 72.00 weight percent being still more preferred, the remainder of the single crystal mullite composition being $SiO_2$. Most preferred is stoichiometric mullite.

As the weight percentage of $Al_2O_3$ goes below 71.80 (the lower limit of solid solution field), the resulting excess of $SiO_2$ could be in the form of cristobalite. Thus, the product will comprise of stoichiometric mullite whiskers with some cristobalite. Cristobalite undergoes a reversible phase g transformation which is accompanied by substantial volume changes during thermal cycling in service. Additionally, for use in composites, it is preferable that mullite is free of cristobalite which can react with matrix materials.

If the weight percentage of $Al_2O_3$ in the composition exceeds the saturation point of an $Al_2O_3$ in stoichiometric mullite solution (about 74.0 weight percent $Al_2O_3$), the product will comprise mullite whiskers and free $Al_2O_3$ which can react with a matrix material and deteriorate the properties of the composite. For this reason, the upper limit of the weight percentage of $Al_2O_3$ is about 74.0 weight percent (the saturation point of $Al_2O_3$ in stoichiometric mullite), with the remainder being $SiO_2$.

Figure 1A:
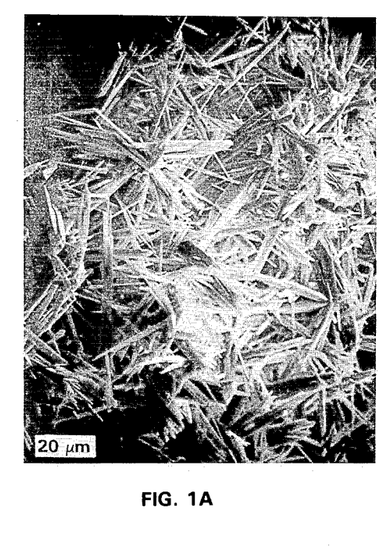
FIGS. 1A through 1C show the mullite-whisker felt produced with final firing temperatures of (A) 1250° C., (B) 1400° C., and (C) 1550° C.
Figure 1B:
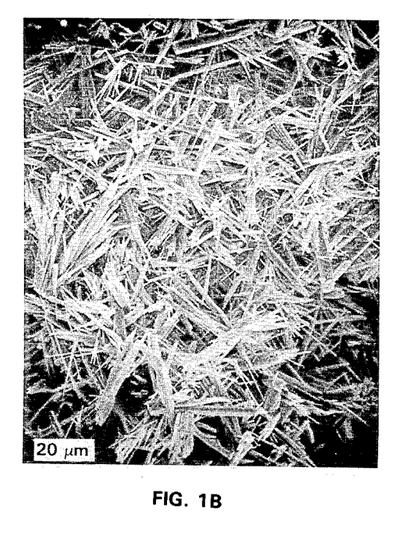
Figure 1C:
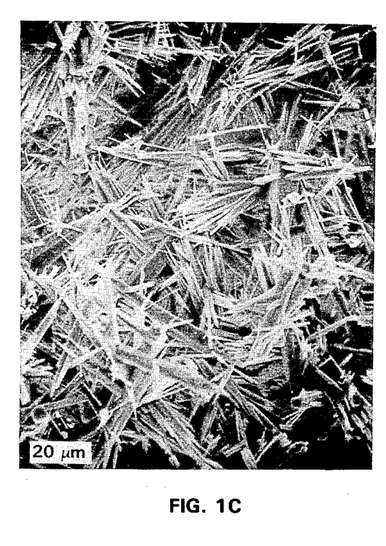
Figure 2A:
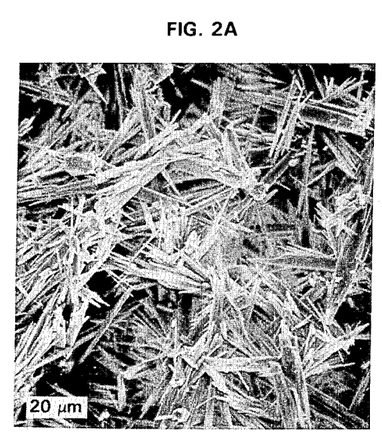
FIGS. 2A through 2D show the mullite-whisker felt produced when (A) 0, (B) 25, (C) 50, and (D) 75 percent of the $AlF_3$ is replaced with $Al_2O_3$ in the starting materials.
Figure 2B:
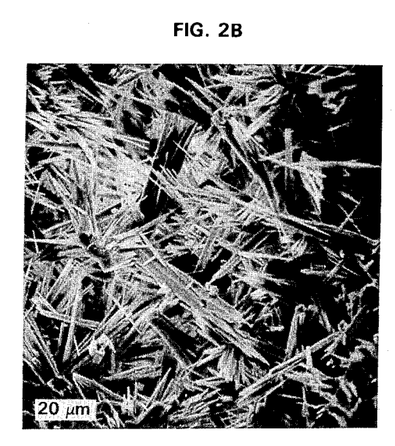
Figure 2C:
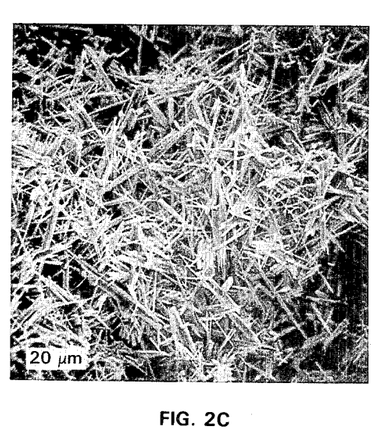
Figure 2D:
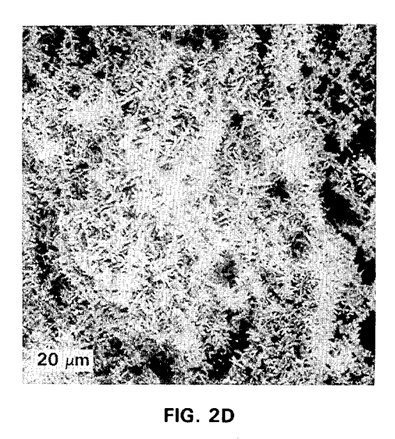

The final rigid mullite whisker felts produced from the $AlF_3$—$SiO_2$ and $AlF_3$—$Al_2O_3$—$SiO_2$ mixtures usually have densities of from about 15 to about 25 percent of the theoretical density of mullite. In other words, they have porosities of from about 85 to about 75 percent. The felt will be of the same shape as the original green bodies with about 1.5 percent or less linear changes FIGS. 1A, 1B, and 1C illustrate the structure of mullite-whisker felt from a mixture of AlF$_3$ and SiO$_2$ fired at 1250° C., 1400° C., and 1550° C. respectively, in an anhydrous SiF$_4$ atmosphere. The felt consists of randomly oriented (in 3 dimensions) and uniformly distributed mullite whiskers which are mechanically interlocked, to form a rigid felt structure. FIGS. 2A, 2B, 2C, and 2D illustrate the structure of mullite-whisker felt produced when (A) 0, (B) 25, (C) 50 and (D) 75 percent of the AlF$_3$ is replaced with Al$_2$O$_3$ in the starting mixtures. The size of the mullite whiskers in the felt gradually decreases with increasing Al$_2$O$_3$ substitution. So, the claimed process allows the modification of structure and properties of the felt by changes in the starting mixture composition. Note that no more than 75 percent of the AlF$_3$ can be replaced by Al$_2$O$_3$ if this process is to work.

The shaped, rigid mullite-whisker felts of this invention are useful as thermal insulators or as preforms for ceramic-matrix and metal-matrix composites.

The range of either the ceramic-matrix material or the metal-matrix material is from more than zero to about 85 volume percent of the composite. When the sum of the volume percent of the ceramic-matrix or metal-matrix material and the volume percent of the mullite-whisker felt is less than 100, the difference is porosity.

The mullite-whisker felt/metal matrix composites can be produce by conventional techniques such as pressure or vacuum infiltration of a molten metal or alloy into the rigid mullite-whisker felt. Any metal or alloy which is compatible with mullite may be used as a matrix. Preferred metal matrix materials include aluminum, magnesium, aluminum-based alloys, and mangesium-based alloys.

The mullite-whisker felt/ceramic matrix composites can be produced by conventional techniques. For instance, gaseous phase ceramic-matrix precusors can be used for chemical vapor deposition or chemical vapor infiltration processes. Further, liquid phase ceramic-matrix precusors in the form of melts or sol-gels can be pressure or vacuum impregnated into the mullite-whisker felt preforms and then converted to the ceramic-matrix material. Ceramic slips are another common technique which may be used.

Any ceramic material which is compatible with mullite may be used. The ceramic materials can be oxide ceramics or non-oxide ceramics. Preferred oxide ceramics include zircon, mullite, alumina, cordierite, chromium oxide, titanium oxide, and silica. Preferred non-oxide ceramics include silicon carbide, silicon nitride, aluminum nitride, and boron nitride.

A combination of compatible ceramic matrix and metal matrix materials might also be used.

The general nature of the invention having been set forth the following examples are presented as specific illustrations thereof. It will be understood that the invention is not limited to these specific examples but is susceptible to various modifications that will be recognized by one of ordinary skill in the art.

EXAMPLE 1

A mixture of 1.26 g. AlF$_3$ (Atomergic Chemetals Corp. 99.9%) and 0.91 g. fused SiO$_2$ (Thermo Materials, 99.5%) were thoroughly mixed in ethanol and then dried in a vacuum oven at 55°–60° C. Wax (as a temporary binder), in the amount of 0.22 g. was dissolved in cyclohexane and added to the mixture. The mixture was dried at 55°–60° C. (to evaporate the solvent), ground with a corundum mortar and pestle and then screened through a 40 um sieve. The resulting powder was then pressed in a steel die at 25 MPa to form 5×5×50 mm bars. The wax was burnt-out in an oxidizing atmosphere at 0.5° C./min up to 300° C. with one hour hold. The bars (5–6 at a time) were fired in a covered corundum crucible (85 ml vol). The bars were fired in a furnace at a temperature ramp of 2° C./min to 1250° C. with a hold at this temperature for 5 hours. Two other runs were made by firing to 1400° C. and 1550° C. with a five hour hold at the final temperatures. X-ray diffraction and scanning electron microscope (SEM) evaluations showed the product to consist of stoichiometric needle-like mullite as shown in FIGS. 1A, 1B, and 1C. The dimensional changes, porosity, and bending strength of the felt were measured and are summarized in Table 2.

TABLE 2

| Firing Temp. (°C.) | Expansion (Linear %) | Porosity (%) | Bending Strength (kg/cm$^2$) | See FIG. |
|---|---|---|---|---|
| 1250 | 1.3 | 79.0 | 39.3 | 1A |
| 1400 | 1.2 | 79.8 | 41.5 | 1B |
| 1550 | 1.2 | 79.5 | 39.4 | 1C |

EXAMPLE 2

Alumina (0.05 um, Buehler) was substituted for AlF$_3$ in amounts up to 75 percent according to the proportions in Table 3. The mixtures were prepared by thoroughly mixing in ethanol and then drying in a vacuum oven at 55°–60° C. Wax (as a temporary binder), in the amount 0.22 g, was dissolved in cyclohexane and added to the mixture. The mixture was then dried at 55°–60° C. (to evaporate the solvent), ground with a corundum mortar and pestle and screened through a 40 um sieve. The resulting powder was then pressed in a steel die at 25 MPa to form 5×5×50 mm bars. The wax was burnt-out in an oxidizing atmosphere at 0.5° C./min up to 300° C. with 1 hour hold. The bars (5–6 at a time) were then fired in a covered corundum crucible (85 ml vol.). The bars were fired in a furnace at a temperature ramp of 2° C./min to 1250° C. with a hold at this temperature for four hours followed by a ramp of 5° C./min to 1550° C. with a hold at this temperature for five hours. X-ray diffraction and scanning electron microscope (SEM) evaluations showed the product to consist of stoichiometric needlelike mullite as shown in FIGS. 2A, 2B, 2C, and 2D. As the amount of Al$_2$O$_3$ substituted for AlF$_3$ increases, the size of the whiskers in the felt decreases. The dimensional changes, porosity, and bending strength of the felt were measured and are summarized in Table 3.

TABLE 3

| % Al$_2$O$_3$ | Expansion (linear %) | Porosity (%) | Bending Strength (kg/cm$^2$) | See FIG. |
|---|---|---|---|---|
| 0 | 1.0 | 78.5 | 37.0 | 2A |
| 0.00/1.26/0.91 | | | | |
| 25 | 1.0 | 78.1 | 29.0 | 2B |
| 0.22/1.09/0.86 | | | | |
| 50 | 0.5 | 77.4 | 54.1 | 2C |
| 0.53/0.82/0.82 | | | | |
| 75 | 0.0 | 76.3 | 70.0 | 2D |

TABLE 3-continued

| % Al$_2$O$_3$ | Properties | | | |
|---|---|---|---|---|
| | Expansion (linear %) | Porosity (%) | Bending Strength (kg/cm$^2$) | See FIG. 5 |
| 0.93/0.51/0.73 | | | | |

Proportions are listed as: g Al$_2$O$_3$/g AlF$_3$/g SiO$_2$.

EXAMPLE 3

A mixture of 1.28 g AlF$_3$ and 0.92 g fused SiO$_2$ was prepared, pressed and fired as in example I but the lid was left off and the material was exposed to an oxidizing atmosphere. X-ray diffraction and SEM examinations showed the product to consist of mullite whiskers and mullite agglomerates as shown in FIG. 5B.

EXAMPLE 4

A mixture of 1.28 g AlF$_3$ and 0.92 g SiO$_2$ gel (instead of fused SiO$_2$) was used as starting materials. The SiO$_2$ gel was prepared using tetraethylorthosilicate (TEOS), (Stauffer Chemical Co., 40.95% SiO$_2$). The TEOS was diluted with ethanol in a 1:1 volume ratio. The solution was added to an aqueous AlF$_3$ suspension. Ammonium (NH$_4$OH) was added dropwise while blending until the mixture thickened as a result of TEOS hydrolysis. The mixture was then dried in vacuum oven at 55°–60° C. The mixture was pressed and then fired as in Example 1 up to 1250° C. for five hours. X-ray diffraction and SEM examinations (for example, see FIG. 6) showed the product to consist of mullite whiskers with alumina inclusions.

Obviously, numerous modifications and variations of the present invention are possible in light of the above teachings. It is therefore to be understood that within the scope of the appended claims the invention may be practiced otherwise than as specifically described herein.

What is claimed as new and desire to be secured by Letters Patents of the United States is:

1. A process for forming a rigid mullite-whisker felt shape comprising the following steps in order:
    (1) forming a green body from an intimate, uniform mixture of AlF$_3$ and fused SiO$_2$ powders in amounts selected to produce stoichiometric mullite;
    (2) heating the green body in an anhydrous SiF$_4$ atmosphere at a temperature of from about 700° C. to about 950° C. until AlF$_3$ reacts with SiO$_2$ to form barlike topaz crystals,
    (3) heating the barlike topaz crystals in an anhydrous SiF$_4$ atmosphere at a temperature of from about 1150° C. to about 1700° C. until the barlike topaz crystals are converted to needlelike single crystal mullite whiskers which form a porous, rigid felt structure.

2. A process according to claim 1 wherein the AlF$_3$ and fused SiO$_2$ powders used in step (1) are mixed in amounts selected to provide
    (a) a molar ratio of AlF$_3$ to SiO$_2$ of 12:13 and
    (b) a slight excess of AlF$_3$ to compensate for AlF$_3$ lost during step (2) due to evaporation.

3. The process of claim 1 wherein the green body in step (1) has a porosity of from about 40 to about 60 volume percent.

4. The process of claim 1 wherein the temperature used in step (3) is from 1250° C. to 1350° C.

5. The process of claim 1 wherein step (2) is replaced by the following step:
    (2) heating the green body in an anhydrous SiF$_4$ atmosphere from room temperature to a temperature of from about 1150° C. to about 1700° C. at a heating rate of from 0.5° to 2.0° C./minute.

6. The process of claim 1 wherein the particles of AlF$_3$ and fused SiO$_2$ are less than 45 microns in size.

7. The process of claim 6 wherein the particles of AlF$_3$ and fused SiO$_2$ are 30 microns or less in size.

8. A process for forming a rigid mullite-whisker felt shape comprising the following steps in order:
    (1) forming a green body from an intimate, uniform mixture of AlF$_3$, Al$_2$O$_3$, and fused SiO$_2$ powders in amounts selected to produce a mullite-whisker felt containing Al$_2$O$_3$ in an amount of from 70.50 weight percent up to the amount that produces a saturated solution of Al$_2$O$_3$ in stoichiometric mullite, with SiO$_2$ comprising the remainder of the mullite; wherein from more than zero to 75 percent of the Al is supplied by Al$_2$O$_3$ with the remainder being supplied by AlF$_3$;
    (2) heating the green body in an anhydrous SiF$_4$ atmosphere at a temperature of from about 700° C. to about 950° C. until the AlF$_3$, SiO$_2$, and Al$_2$O$_3$ react to form barlike topaz crystals; and
    (3) heating the barlike topaz crystals in an anhydrous SiF$_4$ atmosphere at a temperature of from about 1150° C. to about 1700° C. until the barlike topaz crystals are converted to needlelike single crystal mullite whiskers which form a porous, rigid felt structure.

9. The process of claim 8 wherein the AlF$_3$, Al$_2$O$_3$, and fused SiO$_2$ powders are used in amounts selected to produce a mullite-whisker felt containing Al$_2$O$_3$ in an amount of from 71.80 weight percent up to the amount that produces a saturated solution of Al$_2$O$_3$ in stoichiometric mullite with SiO$_2$ comprising the remainder of the mullite whisker felt.

10. The process of claim 9 wherein the AlF$_3$, Al$_2$O$_3$, and fused SiO$_2$ powders are used in amounts selected to produce a mullite-whisker felt containing from 71.80 to 73.00 weight percent Al$_2$O$_3$ with SiO$_2$ being the remainder.

11. The process of claim 10 wherein the AlF$_3$, Al$_2$O$_3$, and fused SiO$_2$ powders are used in amounts selected to produce a mullite-whisker felt containing from 71.80 to 72.00 weight percent Al$_2$O$_3$ with SiO$_2$ being the remainder.

12. The process of claim 11 wherein AlF$_3$, and fused SiO$_2$ powders are used in amounts selected to produce stoichiometric mullite whiskers.

13. The process of claim 8 wherein the green body in step (1) has a porosity of from about 40 to about 60 volume percent.

14. The process of claim 8 wherein the temperature used in step (3) is from 1250° C. to 1350° C.

15. The process of claim 8 wherein step (2) is replaced by the following step:
    (2) heating the green body in an anhydrous SiF$_4$ atmosphere from room temperature to a temperature of from about 1150° C. to about 1700° C. at a heating rate of from 0.5° to 2.0° C./minute.

16. The process of claim 8 wherein the particles of AlF$_3$, Al$_2$O$_3$ and fused SiO$_2$ are less than 45 microns in size.

17. The process of claim 16 wherein the particles of $AlF_3$, $Al_2O_3$, and fused $SiO_2$ are 30 microns or less in size.

18. A rigid mullite whisker felt structure comprising single crystal mullite whiskers which are uniformly distributed and randomly oriented in three dimensions and which are mechanically interlocked to form a rigid felt structure capable of maintaining its shape without binders, wherein the mullite consists essentially of $Al_2O_3$ from the amount in stoichiometric mullite up to the amount which produces a saturated solution of $Al_2O_3$ in stoichiometric mullite, with $SiO_2$ comprising the remainder.

19. The mullite whisker felt structure of claim 18 which has a porosity of from about 75 to about 85 percent.

20. The rigid mullite whisker felt structure of claim 18 wherein the mullite is stoichiometric mullite.

21. The rigid mullite whisker felt structure of claim 18 wherein the mullite-whisker felt contains from 71.80 to 73.00 weight percent of $Al_2O_3$ with $SiO_2$ being the remainder.

22. The rigid mullite whisker felt structure of claim 20 wherein the mullite whisker felt structure contains from 71.80 to 72.00 weight percent of $Al_2O_3$ with $SiO_2$ being the remainder.

23. A rigid mullite whisker felt/metal matrix composite structure comprising:
(1) from about 15 to about 25 volume percent of single crystal mullite whiskers which are uniformly distributed and randomly oriented in 3 dimensions and which are mechanically interlocked to form a strong, rigid felt structure capable of maintaining its shape without a binder wherein the mullite is selected from the group consisting of
(a) stoichiometric mullite and
(b) solid solutions of $Al_2O_3$ in stoichiometric mullite; and
(2) from more than zero to about 85 volume percent of metal matrix;
provided that the sum of the volume percent of the single crystal mullite whisker felt and the volume percent of the metal matrix does not exceed 100.

24. The rigid mullite whisker felt/metal matrix composite structure of claim 23 wherein the metal is selected from the group consisting of aluminum, magnesium, aluminum-based alloys, and magnesium-based alloys.

25. A rigid mullite whisker felt/ceramic matrix composite structure comprising:
(1) from about 15 to about 25 volume percent of single crystal mullite whiskers which are uniformly distributed and randomly oriented in 3 dimensions and which are mechanically interlocked to form a strong, rigid felt structure capable of maintaining its shape without a binder wherein the mullite is selected from the group consisting of
(a) stoichiometric mullite and
(b) solid solutions of $Al_2O_3$ in stoichiometric mullite; and
(2) from more than zero to about 85 volume percent of ceramic matrix;
provided that the sum of the volume percent of the single-crystal mullite whisker felt and the volume percent of the ceramic matrix does not exceed 100.

26. The rigid mullite whisker felt/ceramic matrix composite structure of claim 25 wherein the ceramic is an oxide ceramic.

27. The rigid mullite whisker felt/ceramic matrix composite structure of claim 26 wherein the oxide ceramic is selected from the group consisting of zircon, mullite, alumina, cordierite, chromium oxide, and silica.

28. The rigid mullite whisker felt/ceramic matrix composite structure of claim 25 wherein the ceramic is a nonoxide ceramic.

29. The rigid mullite whisker felt/ceramic matrix composite structure of claim 28 wherein the nonoxide ceramic is selected from the group consisting of silicon carbide, silicon nitride, aluminum nitride, and boron nitride.

* * * * *